S. B. MAYHEW.
SELF SETTING TRAP.
APPLICATION FILED JULY 26, 1910.
996,869.
Patented July 4, 1911.
2 SHEETS—SHEET 1.
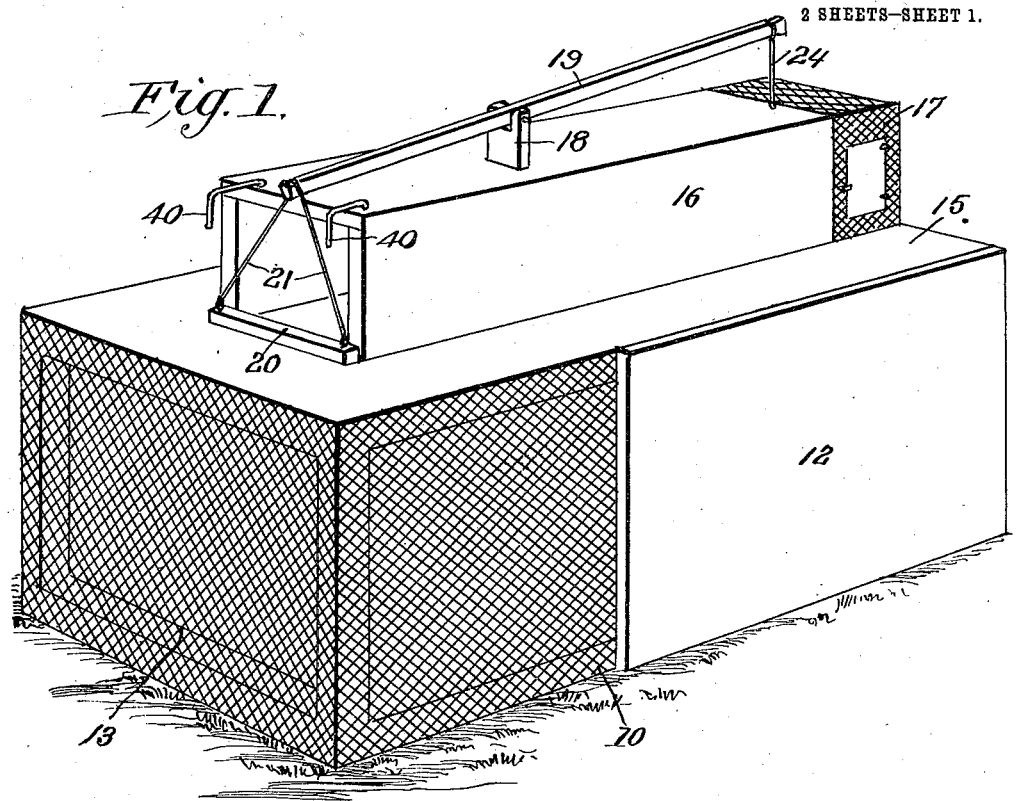
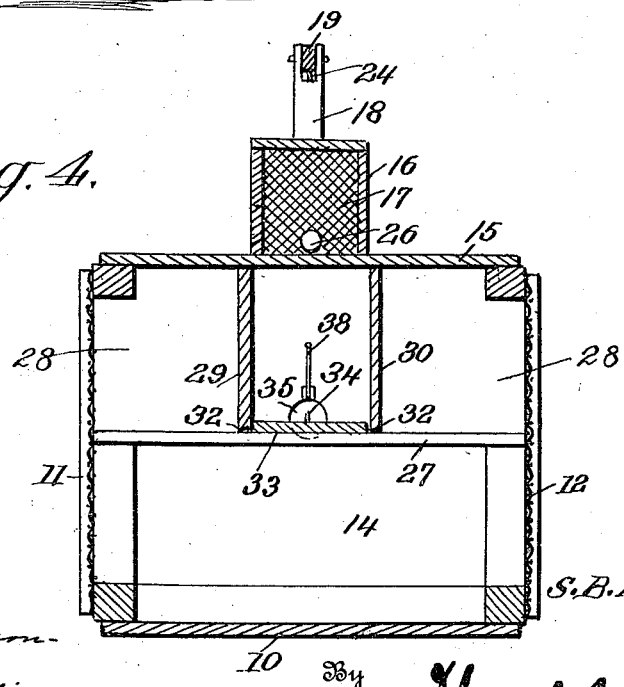

S. B. MAYHEW.
SELF SETTING TRAP.
APPLICATION FILED JULY 26, 1910.
996,869.
Patented July 4, 1911.
2 SHEETS—SHEET 2.
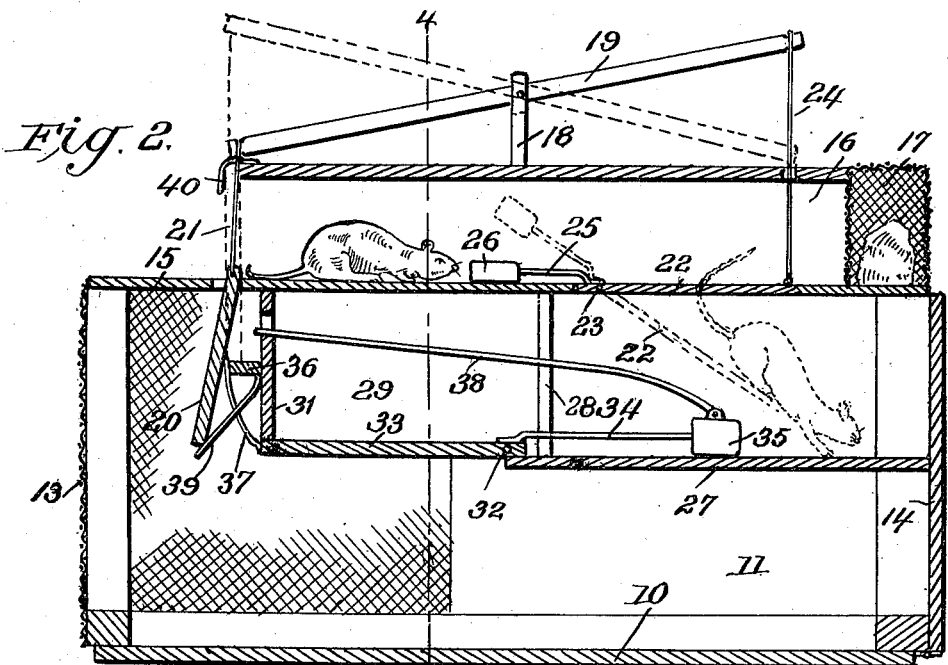
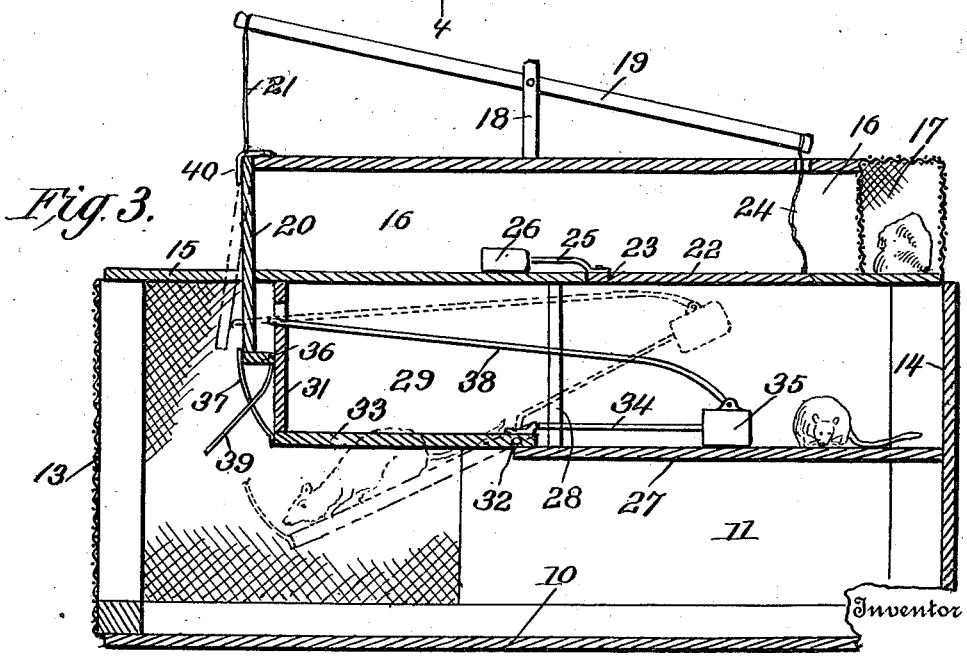

UNITED STATES PATENT OFFICE.

SAMUEL B. MAYHEW, OF ADOLPHUS, KENTUCKY.

SELF-SETTING TRAP.

996,869.

Specification of Letters Patent.

Patented July 4, 1911.

Application filed July 26, 1910. Serial No. 573,996.

*To all whom it may concern:*

Be it known that I, SAMUEL B. MAYHEW, a citizen of the United States, residing at Adolphus, in the county of Allen and State of Kentucky, have invented certain new and useful Improvements in Self-Setting Traps, of which the following is a specification.

This invention relates to traps, having particular reference to a trap adapted to catch small animals, as rats and the like.

The invention has for an object to provide a trap with an improved mechanism whereby the trap is automatically set upon the entrance of one animal so as to catch a second animal entering the trap.

The invention contemplates a trap of this nature having its mechanism so arranged that but few operative parts are necessary, and that these operative parts may be substantially formed and connected together so as to produce an efficient and practical trap.

For a full understanding of the invention reference is to be had to the following description and accompanying drawing in which:—

Figure 1 is a perspective view of the trap set. Fig. 2 is a longitudinal central section through the trap as set. Fig. 3 is a similar view showing the trap closed, the same disclosing in dotted lines the mechanism tripping the slide to automatically open the trap. Fig. 4 is a transverse section on the line 4—4 of Fig. 2.

Corresponding and like parts are referred to in the following description and indicated in all the views of the accompanying drawing by the same reference characters.

Referring to the drawing the numeral 10 designates the bottom of the trap preferably comprising a rectangularly shaped base having the sides 11 and 12 and a closed front 13. The rear end of the trap is provided with a hinged back 14 through which the animals caught are removed. The upper end of the trap is closed by a covering 15 extending the entire length and width of the trap. The trap is provided with a receiving member upon its upper end which is in the form of an elongated housing 16 open at its opposite ends and being of reduced length from the body of the trap.

The rear end of the housing 16 is closed by a bait pocket 17 which is carried against the same and upon the cover 15. The bait pocket 17 is preferably formed from wire meshing and is adapted to completely house the bait so that access cannot be gained to the same from the outside of the trap or from within the housing 16. The housing 16 carries a standard 18 midway of its ends in the upper extremity of which is hinged a connecting rod 19. The connecting rod 19 is pivoted in the standard 18 at its central portion having its extremities extending slightly beyond the opposite ends of the housing 16. A slide 20 closes the forward end of the housing 16 and projects through an aperture formed in the cover 15 provided therefor. A flexible connection 21, preferably in the form of a chain is disposed upon the forward end of the connecting rod 19 and the slide 20.

The cover 15 of the trap forms the bottom of the housing 16 and is provided with an opening therethrough within the rear end of the housing. The opening through the cover 15 is closed by the hinged leaf 22 which is mounted upon a transverse rod 23 and connected at its free or outer end to the rear extremity of the connecting rod 19 by a chain 24. The chain 24 passes upwardly through the housing 16, through which a suitable opening is formed for the chain. The outer end of the hinged leaf 22 seats against the beveled marginal edge of the opening through the cover 15 so as to limit the upward movement of the leaf when closed. The inner or hinged end of the leaf 22 carries a weight arm 25 arranged within the housing 16 and having a weight 26 on its outer end to normally hold the leaf 22 in a closed position.

The trap is provided with a half length partition 27 extending from the hinged back 14 to the central portion of the trap and located midway between the bottom 10 and the cover 15. The partition 27 extends laterally to the sides 11 and 12 and provides two separate chambers in the rear end of the trap. A wall 28 extends from the forward end of the partition 27 to the cover 15 and to the sides 11 and 12, providing two separate compartments in the body of the trap. The wall 28 is provided with a central opening from the marginal edges of which extend parallel walls 29 and 30 to provide an exit channel for the inclosed upper chamber or compartment. A crosspiece 31 engages against the forward edges of the walls 29 and 30 to close the end of the exit channel. A pivoted rod 32 is transversely disposed across the lower edges of the walls 29 and 30 adjacent to their inner ends, and carries a second hinged leaf 33 to close the bottom of the exit channel. The leaf 33 carries a weight-arm 34 upon the outer end of which is disposed a weight 35 for normally holding the hinged leaf 33 in a closed position. The outer extremity of the leaf 33 engages against the lower edge of the cross-piece 31 to limit the upward movement of the hinged leaf. A rest 36 is secured against the outer face of the cross-piece 31 in horizontal relation and is spaced downwardly from the cover 15. The rest 36 is located immediately beneath the slide 20 and is adapted to receive the same when the trap is closed or sprung. The hinged leaf 33 carries a locking or retaining arm 37 passing upwardly from the outer end of the leaf 33 and against the outer face of the cross-piece 36. The retaining arm 37 is of such form that, when the leaf 33 is closed, the upper end of the arm 37 rests against and projects slightly above the rest 36 so as to strike against the outer face of the slide 20 when the same is forced outwardly to open the trap. When the hinged leaf 33 is swung downwardly it carries the retaining arm 37 away from the rest 36, and in order to dislodge the lower end of the slide 20 from the rest 36 a push-rod 38 is employed. The rod 38 comprises an elongated member hinged at its inner end upon the outer extremity of the weight-arm 34 and extends forwardly therefrom through the cross-piece 31 immediately above the rest 36. The rod 38 terminates at its forward end in proximity to the lower end of the slide 20 so that an upward swinging movement of the arm 34 moves the push rod 36 forwardly to strike the lower end of the slide 20 and to force the same from the rest 36.

The cross-piece 31 carries a diagonal guide 39 extending outwardly and downwardly therefrom to receive the lower edge of the slide 20 and to hold the same in an inclined plane so as to avoid contact with the upper extremity of the retaining arm when the hinged leaf 33 is returned to its closed position.

In the operation of the trap, bait is placed in the bait pocket 17 to attract the attention of the animal. The slide 20 is removed from the rest 36 so as to open the forward end of the receiving chamber or housing 16. When the animal enters the housing 16 it moves toward the rear end thereof to get the bait and throws its weight upon the hinged leaf 22. The weight 26 is such that it can be overcome by the weight of the animal to swing the leaf 22 downwardly and deposit the animal in the upper chamber in the trap. The downward movement of the hinged leaf 22 swings the connecting rod 19 to raise the slide 20 and close the forward end of the housing 16. This operation is effected so that if the animal should not fall completely through the opening in the cover 15, but should reënter the housing 16, the animal could not escape. As soon as the animal drops from the leaf 22, the weight 26 returns the leaf to its normal closed position. When the slide moves upwardly under the action of the connecting rod 19 the lower end thereof falls into alinement over the rest 36 and the slide 20 is prevented from dropping into the trap upon the upward movement of the hinged leaf 22. The animal now passes into the exit chamber and its weight falls upon the hinged leaf 33. The weight of the animal is adapted to overcome the weight 35 and to swing the leaf 33 downwardly. This downward movement of the leaf 33 throws the retaining arm 37 from the rest 36 and moves the push rod 38 forwardly to dislodge the slide 20 from the rest. The slide 20 is of such weight that it throws the connecting rod 19 downwardly and moves over the guide 39. This opens the forward end of the housing 16. It will be noted that when the retaining arm 37 is in a raised position, and the slide 20 is upon the rest, that any pressure exerted against the inner side of the slide will not release the lower end of the slide 20 from the rest. The animal falls from the hinged leaf 33 into the lower chamber within the trap and can be withdrawn through the hinged back 14. The animal passes from the upper chamber in the trap to the lower chamber, and by so doing re-sets or opens the trap for a second animal to enter. In this manner the trap is designed to catch an indefinite number of animals, and may be made in various sizes to accommodate animals of various kinds.

The housing 16 carries a pair of spaced retaining fingers 40 depending from its outer end to receive and to hold the upper end of the slide 20 when the same is closed.

Having thus described the invention, what is claimed as new is:—

1. A trap including a body having upper and lower communicating chambers, a housing carried upon the upper end of the trap and having communication with the upper chamber, a slide disposed against the open end of the housing, a hinged leaf carried by the body for closing communication between the housing and the upper chamber, and having connection to the slide, a second hinged leaf arranged within the body between the communicating chambers and having connection with the slide, said hinged leaves adapted to consecutively open and close the slide upon the consecutive opening of the hinged leaves.

2. A trap including a body having upper and lower communicating chambers, an elongated housing formed upon the upper end of the body, a bait-pocket arranged against the rear end of the housing to close the same, a slide mounted against the outer end of the housing to close the same, a hinged leaf carried in the cover of the body and having connection with the slide to close the slide upon the opening of the leaf, a rest carried within the body to support the slide in a closed position, a second leaf hinged within the body for controlling communication between the chambers therein, a retaining arm carried by the second hinged leaf for engagement against the rest to hold the slide thereon, and a push-rod carried by the leaf for engagement with the slide to dislodge the same from the rest upon the opening of the second leaf.

3. A trap including a body having a horizontal partition therein, a front wall carried by the partition and extending to the cover of the body to form an upper compartment, the body having a channel communicating with the upper chamber, a hinged leaf carried in the body for closing the bottom of the exit channel, a rest carried by the channel, a housing arranged upon the upper end of the body and having communication with the upper chamber, and a slide carried by the body for closing the outer end of said housing, said slide adapted to engage upon the rest when closed, said hinged leaf having holding means for engagement with the slide to automatically operate the same.

4. A trap including a body having upper and lower communicating chambers, a housing carried upon the upper side of the body and having communication with the upper chamber, a movable closure for the housing, weight-operated closures arranged between the housing and said upper and between the upper end and said lower communicating chambers, and means disposed within the body and connected to said weight-operated closures for controlling the movements of the closure for said housing.

In testimony whereof, I affix my signature in presence of two witnesses.

SAMUEL B. MAYHEW. [L. S.]

Witnesses:
LATTIE GRAVES,
G. H. NEUMAN.

---

Copies of this patent may be obtained for five cents each, by addressing the "Commissioner of Patents, Washington, D. C."